March 1, 1966 E. W. VOSS 3,238,316

SPHERICAL SHAPED MULTIPLE CONTACT SWITCH WITH PIVOT ARM AND PLUNGER MECHANISM

Filed Nov. 12, 1963

3 Sheets-Sheet 1

INVENTOR

By Elmer W. Voss, deceased
Catherine H. Voss, administratrix

BY R. Y. Peters

ATTORNEY

March 1, 1966 E. W. VOSS 3,238,316

SPHERICAL SHAPED MULTIPLE CONTACT SWITCH WITH PIVOT ARM AND PLUNGER MECHANISM

Filed Nov. 12, 1963 3 Sheets-Sheet 2

INVENTOR

Elmer W. Voss, deceased

By Catherine H. Voss, admistratrix,

BY R. Y. Peters

ATTORNEY

March 1, 1966

E. W. VOSS 3,238,316

SPHERICAL SHAPED MULTIPLE CONTACT SWITCH WITH PIVOT ARM AND PLUNGER MECHANISM

Filed Nov. 12, 1963

3 Sheets-Sheet 3

INVENTOR

Elmer W. Voss, deceased

By Catherine H. Voss, administratrix

BY

R. Y. Peters

ATTORNEY

United States Patent Office 3,238,316
Patented Mar. 1, 1966

3,238,316

SPHERICAL SHAPED MULTIPLE CONTACT SWITCH WITH PIVOT ARM AND PLUNGER MECHANISM

Elmer W. Voss, deceased, late of Greensboro, N.C., by Catherine H. Voss, administratrix, Greensboro, N.C., assignor to Western Electric Company, Incorporated, New York, N.Y., a corporation of New York Filed Nov. 12, 1963, Ser. No. 323,164
8 Claims. (Cl. 200—6)

This invention relates to multiple contact switches, and more particularly to rotational and pivotal switches for selectively controlling a relatively large number of electrical circuits.

In modern electronic and electromagnetic circuitry, it is often necessary to selectively interconnect any or all of a relatively large number of electrical networks. And such interconnections must often be made in accordance with any of a plurality of schemes. Moreover, with the advent of microminiaturized circuitry incorporating transistors and thin-film components, it is especially important to provide a relatively large number of switch combinations with a relatively small mechanical switching expedient.

Accordingly, it is a primary object of the present invention to provide a new and improved multiple contact switch.

Another object of the present invention is the provision of a rotational and pivotal switch for selectively controlling a relatively large number of electrical circuits.

A further object of this invention resides in a multiple contact switch having a spherical contact member movably mounted within a spherical cavity of a housing for selectively engaging and electrically interconnecting any of a plurality of terminals fixed to the housing.

With these and other objects in mind, the present invention contemplates a multiple contact switch having a rotatably and pivotally mounted contactor and a conductive plunger for completing a plurality of electrical circuits. A non-conductive spherical member is movably mounted within a spherical cavity of a non-conductive housing. A plurality of terminals in pre-arranged radial orbits or rings are mounted to the outer surface of the housing and are exposed to the cavity of the housing. A rotatably and pivotally mounted conductive plunger is fixed to the spherical member and extends through a bore provided in the housing. A contactor connected to the plunger is also fixed to the spherical member. The plunger is provided with an actuator for selectively moving the plunger and the conductor to engage and electrically interconnect terminals of the various rings or orbits.

Other objects and advantages of the present invention will become apparent from the following detailed description and the accompanying drawings wherein.

Figure 1:
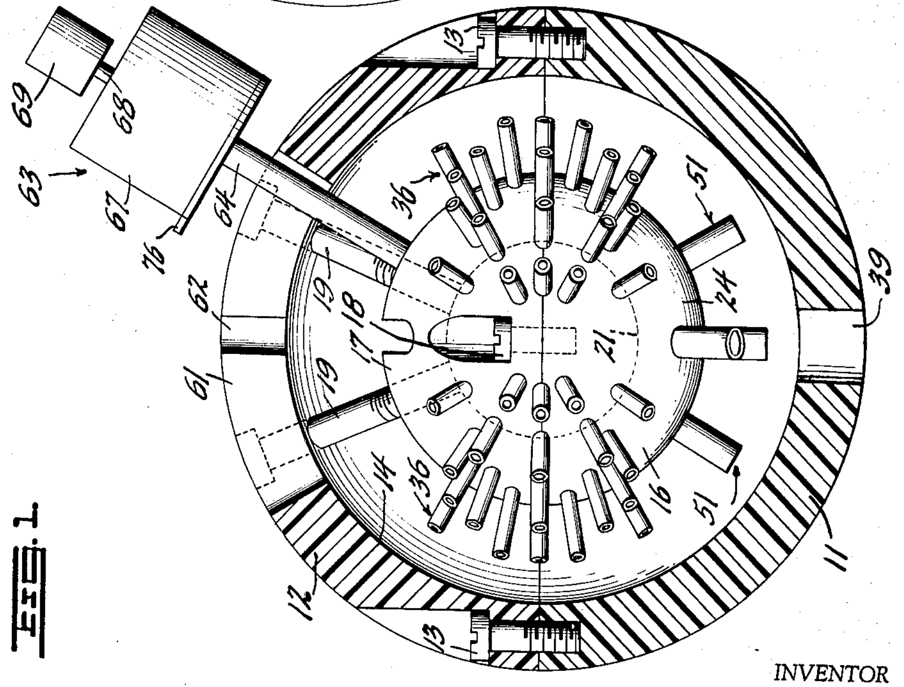
FIG. 1 is a front elevational view partly in section of a multiple contact switch for selectively controlling a relatively large number of circuits.

Referring now to FIG. 1, there is shown a multiple contact switch for selectively controlling a relatively large number of circuits. The switch includes a protective support formed by a lower member 11 removably attached to an upper member 12 to form a cavity 14. The attachment is accomplished by any of the well known attaching expedients, such as threaded members 13 or the like. The supporting members 11 and 12 are composed of a non-conductive material, such as plastic or the like.

Figure 2:
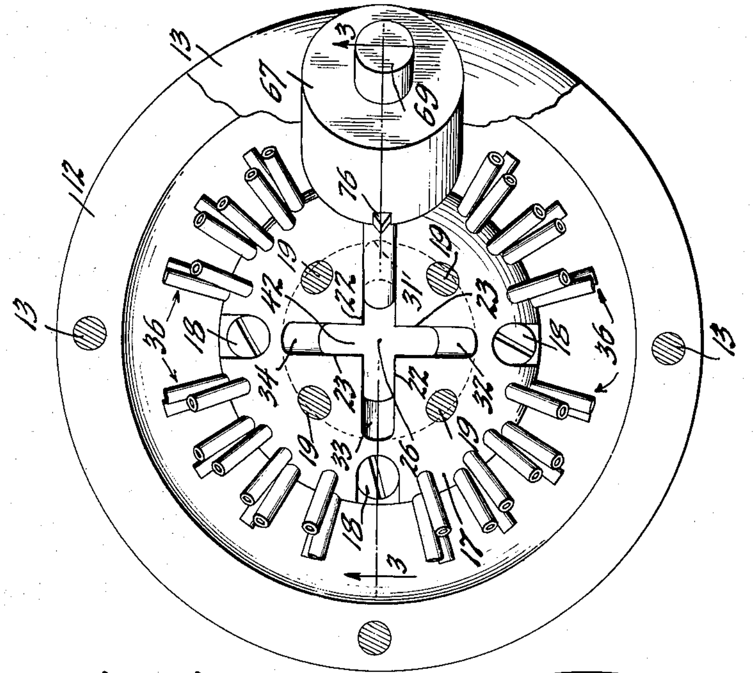
FIG. 2 is a plan view partly in section showing a protective support for the multiple contact switch and a pair of mutually perpendicular slots which define pivotal switch positions at the intersection and the ends of the slots.

A switch housing composed of a lower hemispherical element 16 removably attached to an upper hemispherical element 17 by threaded members 18, FIG. 2, is centrally and removably held within the cavity 14 by threaded members 19. The housing elements 16 and 17 cooperate to form a spherical cavity 21.

The upper housing element 17 is provided with a pair of mutually perpendicular slots 22 and 23, FIG. 2, which extends radially to the cavity 21. The intersection 26 and the ends 31, 32, 33 and 34 of the slots 22 and 23 define a plurality of pivotal switch positions.

A plurality of first conductive terminals 36 are mounted in pre-arranged orbits or rings (mathematically referred to as great circles) to the outer surfaces of the housing elements 16 and 17 and have one of the ends thereof exposed to the cavity 21. The terminals 36 are provided with concavities 37 (clearly shown in FIG. 4) at the ends which are exposed to the cavity 21 and are further provided with openings 38 at the outer extremities thereof. In order not to short circuit the terminals 36, the housing elements 16 and 17 are composed of a non-conductive material, preferably a plastic having heat resistant as well as minimal frictional properties. The plastic commonly sold under the trademark "Teflon" has proved to be a particularly suitable material for the elements 16 and 17.

A plurality of individually insulated electrical conductors of any electronic or electromagnetic apparatus, not shown, to be controlled by the multiple contact switch pass through an aperture 39, FIG. 1 of the supporting member 12 and are connected by plugs or terminal contacts, not shown, to the ends of the terminals 36 having the openings 38 thereat. Since the supporting members 11 and 12 are composed of a non-conductive material, they electrically protect the terminals 36 from being short circuited by coming into accidental contact with metallic members, not shown. Also, members 11 and 12 mechanically support the housing elements 16 and 17 through threaded members 19.

A non-conductive spherical member 42 is movably mounted within the cavity 21 such that the outer surface of the member 42 is contiguous with the walls of the cavity 21. The spherical member 42 preferably has the same properties as the housing elements 16 and 17; especially that of minimal friction, since the member 42 must contiguously move with respect to the housing elements 16 and 17. Radially extending from the center of member 42 is a channel 43, FIG. 4, having a conductive sleeve 44 press fitted therein. Slidably mounted within the sleeve 44 is a contactor including a detent 46 having a rounded end 47. The detent 46 is biased radially outward from the center of the spherical member 42 by a spring 48 mounted within the channel 43. The biasing action of the spring 48 effectuates preselective engagement and electrical connection of the rounded end 47 of the detent 46 with the concavity 37 of one of the terminals 36. Moreover, the cooperative action of the spring 48 and the detent 46 retains the detent 46 in preselective engagement with such terminal 36 until a torque is applied to the spherical member 42 to rotate the detent 46 out of engagement with the concavity 37 of the preselected termial 36 into engagement with another concavity 37 of another selected terminal 36.

A plurality of second conductive terminals 51 are mounted to the outer surface of the lower housing element 16 in opposition to the pivotal switch positions 26, 31, 32, 33 and 34. The terminals 51 are provided with a plurality of channels 52 and openings 53. To connect a plurality of individually insulated conductors, not shown, the conductors are passed through aperture 39, FIG. 1, and plugs or terminal contacts, not shown, of such conductors are removably connected to the ends of the terminals 51 having the openings 53 thereat. Slidably mounted within the channels 52 of the terminals 51 are detents 54 having rounded ends 56. Such detents 54 are radially biased towards the center of member 42 by springs 57 mounted within the channels 52.

Figures 3, 4, 5:
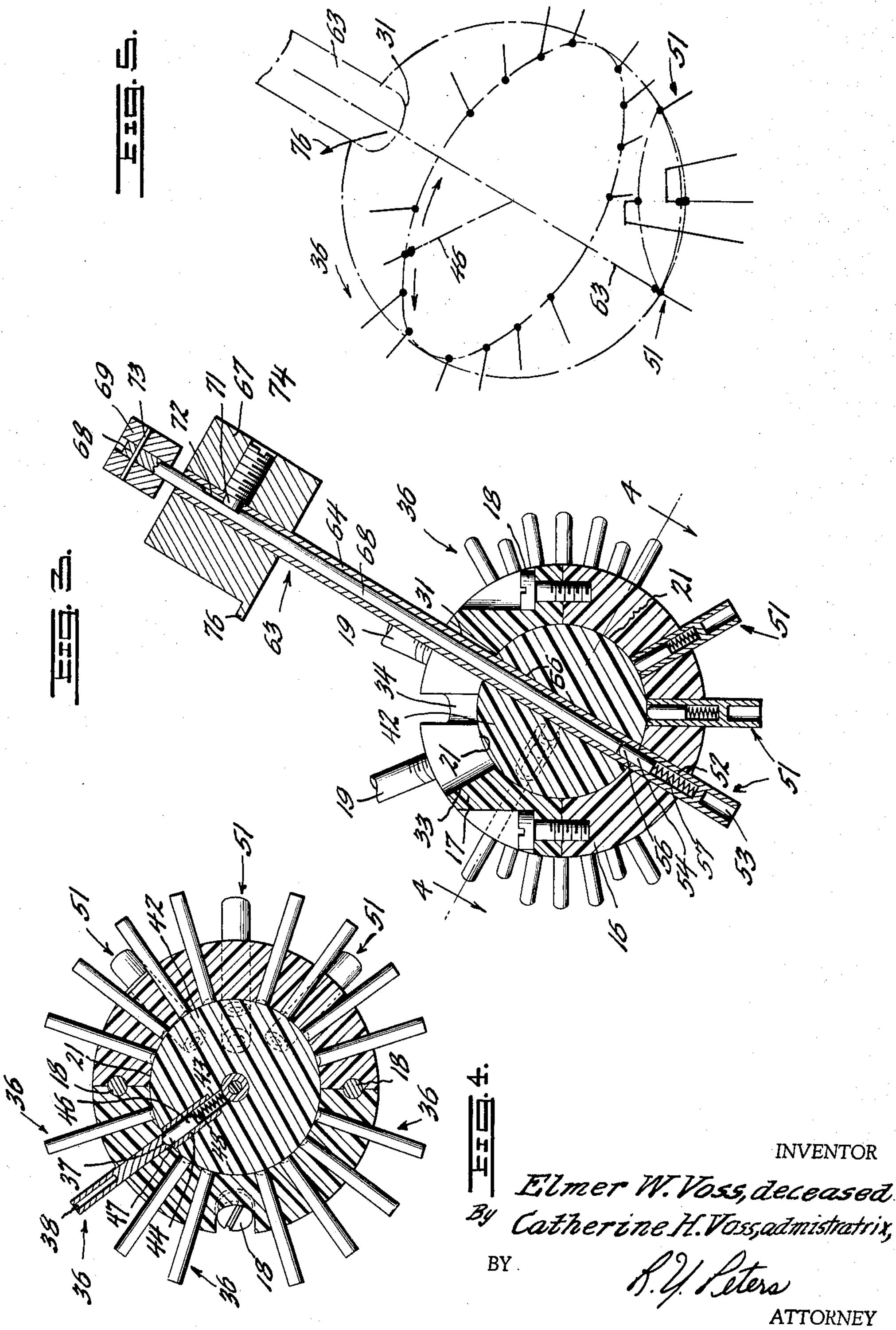
FIG. 3 is a cross-sectional view taken on line 3—3 of FIG. 2 showing a switch plunger located in one of the pivotal switch positions engaging a switch terminal.
FIG. 4 is a cross-sectional view taken on line 4—4 of FIG. 3 showing the manner in which a switch contactor engages another switch terminal.
FIG. 5 is a schematic diagram of the electrical circuit established by the cooperation of the plunger and the contactor.

Extending through a pair of mutually perpendicular slots 61 and 62, FIG. 1, of the supporting member 12, through slots 22 and 23 of housing member 17, FIG. 2, and diametrically through the spherical member 42, FIG. 3, is a plunger 63. The plunger 63 includes a conductive tube 64 press fitted within a channel 66 which diametrically extends through the spherical member 42. The tube 64 is electrically connected to the detent 46 by the spring 48.

A first actuator 67, composed of an insulating material such as plastic, hard rubber or the like, is press fitted to the tube 64. A conductive rod 68 is slidably mounted within the tube 64 for predetermined axial movement. Such movement is effectuated by the depression of a second actuator 69 by an operator and limited by the action of a stop 71 on the walls of a groove 72 formed in the rod 68. The second actuator 69 is fixed to the rod 68 by a pin 73. And the stop 71 is mounted to the first actuator 67 by a set screw 74.

When the second actuator 69 is not depressed, and the plunger 63 is in the pivotal switch position 31 of the slot 22 (as shown in FIGS. 1, 2, and 3), the spring 57 urges the detent 54 radially away from the terminals 51, thereby forcing one of the walls of the groove 72 against the stop 71. Such force on rod 68 permits the rounded end 56 of the detent 54 to slide into an end portion of the tube 64 to lock the plunger 63 in the pivotal switch position 31. The locking of the plunger 63 in the pivotal switch position 31 effectuates the selection of a particular orbit or ring of terminals 36 by the detent 46. Any of the terminals 36 of the selected orbit may be connected to the terminal 51 opposite pivotal switch position 31 simply by the rotation of the first actuator 67 by an operator. Since a pointer 76 is aligned with the detent 46, such pointer 76 indicates the particular terminal 36 which the detent 46 engages.

Thus, any of the terminals 51 may be connected to any of the terminals 36 simply by depressing the second actuator 69, pivoting the plunger 63 into any of the switch positions 26, 31, 32, 33 and 34, and then rotating the first actuator 67 until the pointer 76 indicates that a desired terminal 36 has been selected.

The schematic diagram of FIG. 5, showing the plunger 63 in pivotal switch position 31, illustrates the manner in which the terminal 51 opposite switch position 31 is connected to a particular terminal 36. Such connecting path is traced from terminal 51, plunger 63, detent 46 to terminal 36. The switch position 31 indicates which of the terminals 51 the plunger 63 engages and the pointer 76 indicates which of the terminals 36 the detent 46 engages.

*Operation*

In operation, a plurality of electrical circuits (individually insulated and not shown) to be selectively controlled are passed through the aperture 39 in the lower supporting member 11 and removably attached to the terminals 36 and 51 of the multiple contact switch.

Assuming, for example, that the operator desires to connect an electrical circuit attached to the terminal 51, which is opposite the pivotal switch position 33, FIG. 3, to another circuit attached to one of the terminals 36, the operator depresses the second actuator 69 to axially move rod 68 towards terminals 51 until the stop 71 engages one of the walls of the groove 72, thereby limiting the axial movement of the rod 68. Such axial movement of the rod 68 forces the detent 54 radially away from the center of the spherical member 42 and out of the tube 64 to release the plunger 63 from the pivotal switch position 31, thereby permitting the plunger 63 to be moved into the switch position 33.

Next, the operator places a slight torque on the first actuator 67 and pivotally moves the plunger 63, while maintaining the second actuator 69 depressed, to the pivotal switch position 33. Then, the operator releases the second actuator 69, thereby permitting the spring 52 to urge the detent 54 radially away from the terminal 51. Such force on the rod 68 permits the rounded end 56 of the detent 54 to slide into the end portion of the tube 64 to engage or lock the plunger 63 in the pivotal switch position 33. Engagement of the plunger 63 by the detent 54 positions detent 46 to sweep into engagement with any of the terminals 36 located in an orbital plane perpendicular to the tube 64 of the plunger 63. Hence, the particular circuit connected to the terminal 51 opposite the pivotal switch position 33 has been electrically connected to the conductive rod 68 and the conductive tube 64; the detent 46 has been positioned to sweep into engagement with certain terminals 36.

Next, the operator rotates the first actuator 67 to mechanically engage and electrically connect the detent 46 to a particular terminal 36 and the circuit connected thereto.

Thus, the circuit of the terminal 51 opposite the pivotal switch position 33 has been electrically connected to one of the terminals 36 positioned within the orbital sweep of the detent 46.

*Alternative embodiment*

Figures 7, 8:
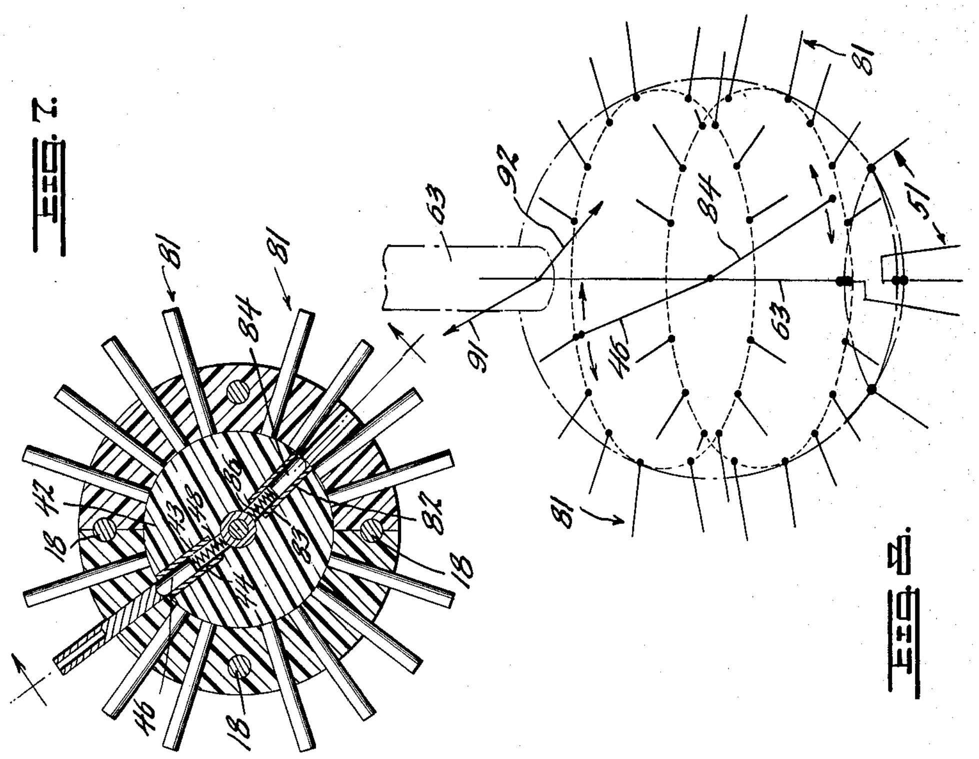
FIG. 7 is a cross-sectional view taken along lines 7—7 of FIG. 6 showing the manner in which the contactors alternately engage and disengage a plurality of terminals mounted in pre-arranged orbits.
FIG. 8 is a schematic diagram of the electrical circuit established by the cooperation of the plunger and the contactors.
Figure 6:
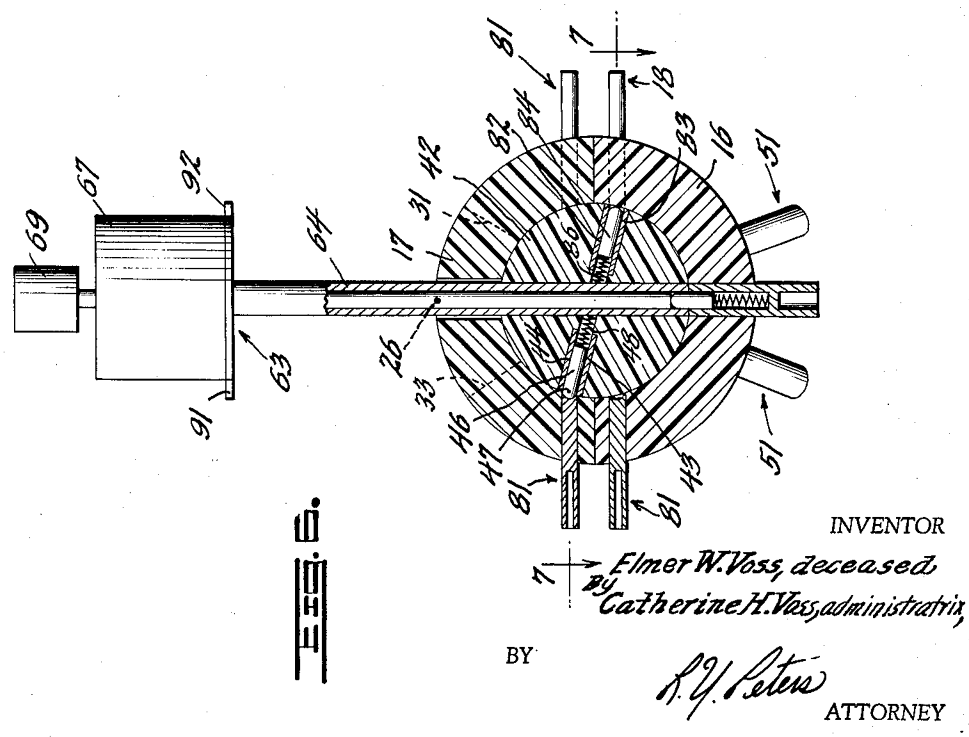
FIG. 6 is a front elevational view partly in section of another embodiment of the multiple contact switch showing the manner in which the switch plunger and switch contactors engage the switch terminals.

As an alternative embodiment of the invention, there is shown in FIGS. 6–8 a multiple contact switch similar to that in FIGS. 1–5 except instead of having a plurality of radially extending terminals 36, the alternative embodiment has a plurality of contacts perpendicular to the axis of the terminal 51 located opposite to the pivotal switch position 26. In addition, the alternative embodiment of FIGS. 6–8 includes a channel 82 into which a second contactor is positioned. The second contactor includes a conductive tube 83 press fitted within the channel 82 and a detent 84 biased outwardly from the tube 64 by a spring 86. Therefore, the alternative multiple contact switch is capable of conneceing a circuit attached to the terminals 51 opposite pivotal switch positions 26, 32, 33, and 34, FIGS. 2 and 6, alternately to an upper ring of terminals 81 and to a lower ring of terminals 81.

If it is desired to disconnect the circuits connected to the terminals 51 from the circuits connected to the terminals 81, the plunger 63, FIG. 6, is pivotally moved, after depression of the second actuator 69, to the pivotal switch position 31. Thus, the alternative embodiment of the multiple contact switch provides another scheme for interconnecting a plurality of electrical circuits.

The schematic diagram of FIG. 8, showing the plunger 63 in pivotal switch position 26, illustrates the manner in which the terminal 51 opposite switch position 26 is alternately connected to the terminals 81 in upper and lower rings. The switch position 26 indicates which of the terminals 51 the plunger 63 engages and the pointers 91 and 92 indicate which of the terminals 81 the detents 46 and 84 engage.

The operation of the multiple contact switch of FIGS. 6–8 is similar to that of FIGS. 1–5, the primary difference between the switches being the resulting circuit interconnections.

It is to be understood the above described multiple contact switch may have almost an infinite array of terminals and contactors and a plurality of electrical circuits may be interconnected in a variety of ways. More particularly, the surfaces of housing members 16 and 17 may be divided up in geometric or logarithmic progressions and the contacts 36 and 51 may be accordingly fixed to such surfaces. Also, by increasing the size of the supporting members 11 and 12 and the housing elements 16 and 17, additional terminals 36 and 51 may be added thereby increasing the number of possible switch positions.

The miniature structure of the multiple contact switch of the present invention relative to the large number of switching combinations readily brings to light its importance as a switching expedient in micro-miniaturized electronic and electromagnetic circuitry; especially vast arrays of circuits incorporating thin film components.

It is to be understood that the above described embodiments of the invention are merely illustrative and that numerous modifications may be made of the embodiments within the spirit and scope of the invention.

What is claimed is:

1. In a multiple contact switch, a non-conductive housing having a spherical cavity and a passageway extending thereto, a plurality of pre-arranged first and second conductive means mounted in said housing and exposed to said cavity, a non-conductive spherical member mounted within said cavity and engaging the walls thereof, third conductive means mounted in said spherical member, and means extending through said pasageway and said spherical member for pivoting said spherical member to selectively engage said second conductive means and then for rotating said spherical member to then selectively engage said third conductive means with said first conductive means.

2. In a multiple contact switch, an insulating housing having a spherical cavity and a passageway extending thereto, a plurality of first and second conductive terminals mounted in said housing and exposed to said cavity, a non-conductive spherical member movably mounted within said cavity and engaging the walls thereof, a conductive plunger extending through said passageway and said spherical member for pivoting and rotating said spherical member, a contactor mounted within the spherical member and extending to said conductive plunger to engage one of said first terminals, and means for moving said conductive plunger to move said spherical member to selectively engage said plunger with one of said second terminals and to selectively engage said contactor with one of said first terminals, thereby electrically interconnecting selected first and second terminals.

3. In a multiple contact switch, a non-conductive housing having a spherical cavity and a passageway extending thereto, a first and a second ring of conductive terminals mounted in said housing and exposed to said cavity, a non-conductive spherical member movably mounted within said cavity and engaging the walls thereof, a conductive plunger extending through said passageway and said spherical member to selectively engage the terminals of the first ring for rotating the pivoting said spherical member, a contactor within the member for selectively connecting said plunger to the terminals of said second ring, and means for pivoting and rotating the plunger to move said spherical member to selectively engage the plunger to the terminals of said first ring and to selectively engage the contactor to the terminals of said second ring, thereby electrically interconnecting the terminals of said first and second rings.

4. In a multiple contact switch, a non-conductive housing having a spherical cavity and having a pair of mutually perpendicular slots extending to said cavity to define pivotal switch positions at the intersection and the ends of the slots, a first plurality of rings of conductive terminals having one end of said terminals exposed to said cavity and having concavities at said ends, a non-conductive spherical member mounted within said cavity in movable contact with said housing and having a radially extending channel, a second plurality of rings of hollow conductive terminals mounted to the outer surface of the housing in opposition to the pivotal switch positions and exposed to the cavity of said housing, a plurality of first detents positioned within the second terminals, a conductive tube selectively extending through said slots and diametrically through said spherical member to selectively engage the first detents for both rotating and pivotally moving said spherical member within the housing, a second detent mounted within said radially extending channel, first conductive means disposed between said tube and said second detent for biasing said second detent into selective mechanical engagement and electrical connections with the concavities of the first terminals, second conductive means disposed within the second terminals for biasing said first detents into selective mechanical engagement and electrical connection with said tube, a rod mounted within said tube for predetermined axial movement to selectively disengage and electrically disconnect said first detents from said conductive tube, means for axially moving said rod, and means responsive to the movement of said rod for pivotally moving said tube from a disconnected switch position to another switch position and for rotating said second detent to selectively engage and electrically connect said second detent to the concavities of the terminals of said first ring.

5. In a multiple contact switch, a non-conductive housing having a spherical cavity and a passageway extending thereto;

a first, a second, and a third ring of conductive terminals mounted in said housing and exposed to said cavity;

a non-conductive spherical member movably mounted within said cavity and engaging the walls thereof;

a conductive plunger extending through said passageway and diametrically through said spherical member to selectively engage the terminals of the first ring for rotating and pivoting said spherical member;

a first and a second contactor within the member for selectively connecting said plunger to the terminals of said second and third rings;

and means for selectively moving the plunger to move the spherical member to successively and alternately engage and electrically connect the terminals of said second and third rings to the terminals of said first ring.

6. In a multiple contact switch, a first hollow sphere,
a plurality of terminals arranged in a ring about the inner periphery of said first sphere,
a spring loaded contact element mounted in said first sphere and projecting toward the center of said ring of contacts,
a second sphere mounted within said first sphere for engaging and depressing said spring loaded contact element,
a conductive tube extending through said second sphere for receiving said spring loaded contact,
a contactor extending radially from the conductive tube to the periphery of said second sphere,
and means for pivoting the second sphere to move the conductive tube to receive the spring loaded contact element and for rotating said second sphere about the contact element to sequentially engage the contactor with ring contacts.

7. In a multiple contact switch,
a first hollow sphere,
a plurality of terminals arranged in a great circle about the inner surface of said first sphere,
a spring loaded contact element mounted in said first sphere and coinciding with the axis of said great circle,
a second sphere mounted within said first sphere for engaging and depressing said spring loaded contact element,
a conductive tube extending through the axis of said great circle for receiving said spring loaded contact elements,
a contactor perpendicular to the conductive tube and extending radially from said tube to the outer surface of said second sphere, and means for pivoting the second sphere to move the conductive tube to receive the spring loaded contact element and for rotating said second sphere about the contact element to sequentially engage the contactor with the terminals of the great circle.

8. In a multiple contact switch,
a first hollow sphere,
a plurality of terminals arranged in a plurality of great circles about the inner surface of said sphere,
a plurality of spring loaded contact elements mounted in said sphere and coinciding with the axes of said great circles,
a second sphere mounted within said first sphere for engaging and depressing said spring loaded contact elements,
a conductive tube extending through the center of said second sphere for receiving said spring loaded contact elements,
a contactor perpendicular to the conductive tube and extending radially from said tube to the outer surface of said second sphere, and
means for pivoting the second sphere to move the conductive tube to selectively receive the spring loaded contact elements and for rotating said second sphere about said contact elements to selectively and sequentially engage the contactor with the terminals of one of said great circles.

References Cited by the Examiner

UNITED STATES PATENTS

| | | | |
|---|---|---|---|
| 1,995,708 | 3/1935 | Fischer. | |
| 2,917,611 | 12/1959 | Houston ___________ | 200—161 |
| 3,166,645 | 1/1965 | Shlesinger ________ | 200—161 X |

KATHLEEN H. CLAFFY, *Primary Examiner.*